(12) United States Patent
Gluckman et al.

(10) Patent No.: US 7,710,451 B2
(45) Date of Patent: May 4, 2010

(54) RECTIFIED CATADIOPTRIC STEREO SENSORS

(75) Inventors: Joshua M. Gluckman, New York, NY (US); Shree K. Nayar, New York, NY (US)

(73) Assignee: The Trustees of Columbia University in The City of New York

( * ) Notice: Subject to any disclaimer, the term of this patent is extended or adjusted under 35 U.S.C. 154(b) by 1171 days.

(21) Appl. No.: 10/149,687

(22) PCT Filed: Dec. 13, 2000

(86) PCT No.: PCT/US00/42796
§ 371 (c)(1),
(2), (4) Date: Feb. 25, 2003

(87) PCT Pub. No.: WO01/46742
PCT Pub. Date: Jun. 28, 2001

(65) Prior Publication Data
US 2003/0156187 A1   Aug. 21, 2003

Related U.S. Application Data

(60) Provisional application No. 60/170,391, filed on Dec. 13, 1999.

(51) Int. Cl.
*H04N 13/02* (2006.01)
*H04N 7/00* (2006.01)

(52) U.S. Cl. .......................... 348/46; 348/36

(58) Field of Classification Search .......... 348/49, 348/343, 369, 42, 37, 36, 38, 39, 46, 47, 348/51, 53, 64, 578, 580, 43, 44, 45, 48, 348/50, 52, 54, 55, 56, 57, 58, 59, 60, 72, 348/70; 382/154, 285, 284, 305, 294
See application file for complete search history.

(56) References Cited

U.S. PATENT DOCUMENTS 3,670,097 A   6/1972   James L. Jones (Continued)

FOREIGN PATENT DOCUMENTS

| GB | 505602 | 11/1937 |
|----|--------|---------|
| JP | 10-145656 | * 5/1998 |

OTHER PUBLICATIONS

Zhang, et al. "3D Reconstruction from a Single View of an Object and its Image in a Plane Mirror" 1051-4651/98; IEEE, 1998, pp. 1174-1176.

*Primary Examiner*—Behrooz Senfi
(74) *Attorney, Agent, or Firm*—Baker Botts LLP

(57) ABSTRACT

The invention presents catadioptric (single-camera) sensors using one or more mirrors to produce rectified stereoscopic images. By combining multiple views (using the mirrors) to form a composite stereo image that is already rectified (i.e., has scan-line correspondence), the invention aids provision of real-time stereo images by avoiding computational cost and image degradation due to computer-rectification-related resampling when rectifying. The invention specifies the number of mirrors that must be used and the geometric/locational constraints on those mirrors that must be substantially satisfied to obtain rectified stereo images with a single camera. The invention also discloses specific configurational techniques for how the mirrors should be placed to minimize sensor size. The configurational/geometric parameters disclosed enable cost-efficient, compact, and error-tolerant single-camera stereoscopic image sensing system and methods, removing the need for computer-controlled image rectifying steps and allowing for convenient computerized capture, processing, manipulation, storage, and transmission of stereo images.

16 Claims, 13 Drawing Sheets

U.S. PATENT DOCUMENTS

| | | | |
|---|---|---|---|
| 6,034,716 A * | 3/2000 | Whiting et al. | 348/36 |
| 6,215,519 B1 * | 4/2001 | Nayar et al. | 348/159 |
| 6,507,358 B1 * | 1/2003 | Mori et al. | 348/42 |
| 6,643,396 B1 * | 11/2003 | Hendriks et al. | 382/154 |
| 6,654,063 B1 * | 11/2003 | Tadatsu | 348/373 |
| 6,665,003 B1 * | 12/2003 | Peleg et al. | 348/36 |
| 6,795,109 B2 * | 9/2004 | Peleg et al. | 348/36 |

* cited by examiner

FIG. 18a
 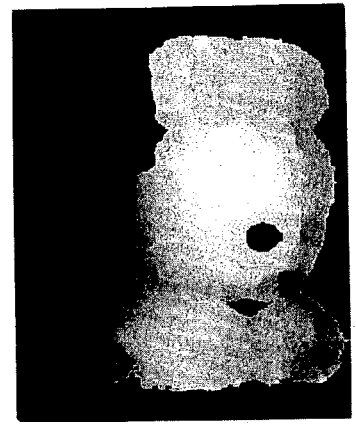
FIG. 18b          FIG. 18c

RECTIFIED CATADIOPTRIC STEREO SENSORS

This application claims the benefit of, and incorporates by reference in its entirety, U.S. Provisional Patent Application No. 60/170,391, filed Dec. 13, 1999. The invention set forth in this application concerns improved systems for forming of stereoscopic visual images, and in particular concerns catadioptric systems utilizing one or more mirrors to supply rectified stereoscopic images that can be stored and processed in, for instance, computerized imaging systems without requiring computer processing to rectify the different constituents of the stereoscopic image.

This invention was made with government support under grant number N00014-95-1-0601 awarded by the Office of Naval Research. The government has certain rights in the invention.

BACKGROUND OF THE INVENTION

Sterescopic (or stereo) images, as is known in the art, are images formed by combining (nonstereoscopic) views of the same scene or object from two or more vantage points or angles. The combination of a plurality of different-vantage views of the same scene or object creates a composite image of that scene or object with the appearance of enhanced depth and dimensionality—i.e., more visual information and perspective regarding the scene or object may be provided by a stereo image combining the visual information provided by a plurality of non-stereo views (which may also be regarded as a visual pair) of the object or scene from various vantage points. In one convenient arrangement for providing stereoscopic images, a stereo image may be formed by simultaneously providing two or more views of the object simultaneously to a common imaging point, which in most cases will be a planar imaging surface. To take a simple example, a stereo image of a person's face might be formed by causing two (non-stereo, or direct) images, one from either side of the person's face, to converge simultaneously at the planar surface of a piece of photographic film (or a video camera lens). Accordingly, a composite stereo image, including data from either side of the face, is formed upon the image point or plane and recorded.

Following recording of this stereo image, it may be processed and stored using a variety of techniques. Of particular interest are computerized techniques for image storage and manipulation. For instance, a stereographic photograph print formed by film may be digitally stored by optically scanning the print (for instance, in line-by-line fashion along a defined horizontal scan axis) into a computer memory. Subsequently, the digital stereoscopic image may be altered, printed out, transmitted, or otherwise manipulated by the computer system.

There are a variety of methods and systems for providing the multiple vantage views or non-stereo sub images that are caused to converge at the image point to form a composite stereo image. Catadioptric systems are optical systems that consist of a combination of mirrors and lenses. Catadioptrics can be used to design stereo sensors that use only a single camera. Although such systems use a variety of different mirror shapes and configurations, the underlying motivation is the same. By using multiple mirrors, scene points can be imaged from two or more viewpoints while using only a single camera. The constituent views being supplied by the two or more viewpoints may be conceptualized as being supplied by corresponding "virtual cameras" at the respective viewpoint vantages.

Single camera stereo has several advantages over traditional two-camera stereo. Because only a single camera and digitizer are used, system parameters such as spectral response, gain, and offset are identical for the stereo pair. In addition, only a single set of internal calibration parameters needs to be determined. Perhaps most important is that single camera stereo simplifies data acquisition by only requiring a single camera and digitizer and no hardware or software for synchronization.

Real-time stereo systems, whether catadioptric or two-camera, require images to be rectified prior to stereo matching. A pair of stereo images is rectified if the epipolar lines are aligned with the scan-lines of the images. When properly aligned, the search for correspondence is simplified and thus real-time performance can be obtained. Once the epipolar geometry of a stereo system is determined, rectifying transformations can be applied to the images When properly aligned, the search for correspondence is simplified and thus real-time performance can be obtained. Once the epipolar geometry of a stereo system is determined, rectifying transformations (provided typically by computer software routines) can be applied to the images. However, rectifying in this manner has two disadvantages for real-time stereo. Applying transformations to the images at run-time is both computationally costly and degrades the stereo data due to the resampling of the images.

An alternative to rectifying the images at run-time is to ensure that the geometry of the stereo image-forming system produces images that are rectified from the outset, and hence to not require any computer-provided software rectification. With two-camera stereo this goal is accomplished by removing any rotation between the two-cameras, aligning the direction of translation with the scan lines of the cameras and using identical internal parameters for the two cameras (a difficult task). The geometric requirements of a rectified catadioptric stereo system are not trivial and are not believed to have been studied to date.

Several researchers have demonstrated the use of both curved and planar mirrors to acquire stereo data with a single camera. Curved mirrors have been primarily used to capture a wide field of view. One of the first uses of curved mirrors suggested a wide field of view stereo system consisting of a conventional camera pointed at two specular spheres (see FIG. 1(a)). A similar system using two convex mirrors, one placed on top of the other, has also been proposed (see FIG. 1(b)). Finally, there have been presented several different catadioptric stereo configuration using a single camera with parabolic, elliptic and hyperbolic mirrors.

Several others have also investigated the use of planar mirrors to design single camera stereo sensors. One proposed sensor uses two planar mirrors connected by a hinge centered in the field of view of the camera. It has also been demonstrated how two mirrors in an arbitrary configuration can be self-calibrated and used for single camera stereo (see FIG. 1(c)). Stereo systems using four planar mirrors have, further, been proposed (see FIG. 1(d)). By imaging an object and its mirror reflection, it is known that a stereo image can also be obtained using only a single mirror.

In all of these prior art systems, the stereo images are not rectified, therefore the images must be transformed at run-time prior to stereo matching. One exception is a proposed system described that uses prisms rather than mirrors to acquire rectified stereo images from a single camera. Although prisms are an interesting alternative to mirrors, it is not clear that compact sensors with sufficient baseline can be designed.

Real-time stereo systems, whether catadioptric or two-camera, require images to be rectified prior to stereo matching. A pair of stereo images is rectified if the epipolar lines are aligned with the scan-lines of the images. When properly aligned, the search for correspondence is simplified and thus real-time performance can be obtained. Once the epipolar geometry of a stereo system is determined, rectifying transformations can be applied to the images. However, rectifying in this manner has two disadvantages for real-time stereo. Applying transformations to the images at run-time is both computationally costly and degrades the stereo data due to the resampling of the images.

Thus, it would be desirable to provide a system for single-camera forming of stereoscopic images wherein the constituent non-stereo image views did not require any computer-provided rectifying processing. It would further be desirable to provide a system for real-time stereo imaging that lowers computational demands on computer systems employed in processing, storing, manipulating, and transmitting the stereo images formed thereby. It would be desirable, too, to have sensor geometry allowing for minimization of sensor size. It would likewise be desirable to avoid degradation of stereo image quality by reducing or eliminating the need for resampling of images and consequent data degradation. It would also be desirable to provide a system and method having geometric constraints for the locating of the image point or plane vis à vis the imaged object and one or more mirrors employed in supplying the constituent sub-image views to the image point, such that under those geometric constraints, the stereo image delivered to the image point was inherently rectified by virtue of the system geometry, and did not require additional rectification. It would still further be desirable to provide a stereo imaging system meeting these objectives and having a reasonable degree of error tolerance such that minor imperfections in constructing and applying the stereo sensing system would not defeat the object of obtaining useful stereo images. The prior art does not meet these needs.

SUMMARY OF THE INVENTION

The present invention has two principal goals. First, to develop the constraints that must be satisfied to ensure rectified images, and second to describe an automated tool for placing the mirrors such that sensor size is minimized for a given baseline. These results can be used to design and build novel compact stereo sensors.

The present invention describes as an alternative to rectifying the images at run-time is to ensure that the geometry of the stereo system produces rectified images. With two-camera stereo this has been accomplished by removing any rotation between the two cameras, aligning the direction of translation with the scan lines of the cameras and using identical internal parameters for the two cameras (a difficult task). The geometric requirements of a rectified catadioptric stereo system are not trivial and have not been studied. The development of the present invention is twofold. First, to develop the constraints that must be satisfied to ensure rectified images, and second to describe an automated tool for placing one or more mirrors to provide virtual-camera images that can be combined into a composite stereoscopic image at the single-camera imaging plane such that sensor size is minimized for a given baseline. These results can be used to design and build novel compact stereo sensors. The sensor systems of the present invention can, further, be practicably built in accordance with the disclosed methods such that the presence of small errors deviations (for instance, in alignment or rectification) do not detract from substantially achieving the goal of simply obtaining useful stereo images with minimal or no additional processing or computer rectification.

Thus, the present invention provides a system and method for capturing stereoscopic visual images made up of at least one visual pair, the device and method employing a single image detector and at least one substantially-planar mirror, wherein the mirror (with no further rectifying or computer processing required) rectifies the visual pair to produce a stereoscopic image.

The present invention also provides a device and method for capturing stereoscopic visual images of a scene, employing: a single planar image detector lying in a first plane; and one or more (e.g., three) mirrors situated in accordance with specified geometric constraints as to the image plane and as to other elements (e.g., other mirrors) within the imaging system, such that rectified images are supplied at the image plane to form a stereoscopic image with no further (e.g., computer-aided) rectification.

BRIEF DESCRIPTION OF THE FIGURES

FIG. 1 depicts several prior art single-camera stereo imaging systems using a variety of mirrors. By imaging two reflections of a scene point, the three-dimensional (3-d) location can be determined from a single camera where.

FIG. 7 illustrates shifting of the image detector to reduce asymmetry in the stereo field of view.

FIG. 12 depicts optimized stereo sensors for baseline b.

FIG. 17 illustrates exemplary one- and three-mirror rectified stereo systems using a Sony XC-75 camera with a Computar 4 mm pinhole lens.

FIG. 18 illustrates generally the provision of single mirror rectified stereo. FIG. 18(a) shows an image (cropped for display) captured by the single mirror stereo system. Note that the right side of the image is reflected. To demonstrate that the images are rectified, stereo matching along the scan-lines of is performed after removing the reflection. FIGS. 18(b) and 18(c) are the depth maps computed using SSD and normalized cross-correlation with a 15×15 window. Normalized cross-correlation performs slightly better due to the intensity differences introduced by the reflection of scene rays at acute angles with the mirror. Depth is not computed for background pixels.

FIG. 19 illustrates images and depth maps using three mirror rectified stereo.

DETAILED DESCRIPTION OF THE PREFERRED EMBODIMENTS

Figure 1A:
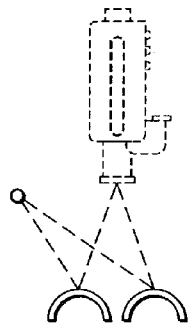
FIG. 1(a) depicts the use of two spherical mirrors.
Figure 1B:
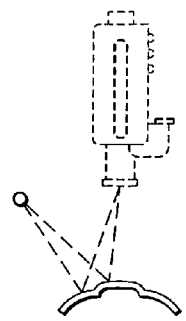
FIG. 1(b) depicts the use of two stacked convex mirrors.
Figure 1C:
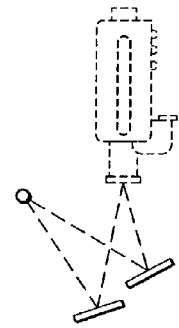
FIG. 1(c) depicts the use of two planar mirrors.
Figure 1D:
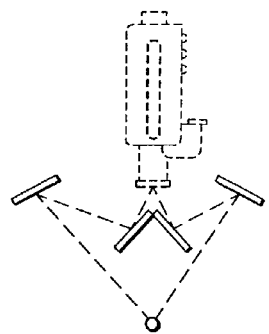
FIG. 1(d) depicts the use of four planar mirrors.
Figure 2A:
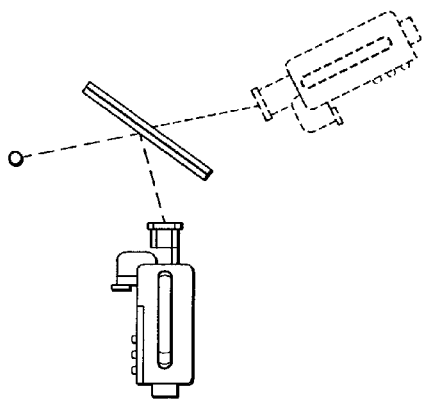
FIG. 2 depicts generally the use of planar mirrors for image formation in stereoscopic systems as known in the prior art.

Before describing the requirements for rectified catadioptric stereo, it will be helpful to review the basic systems and methods of image formation with planar mirrors. As FIG. 2(a) shows, the image formed when a mirror reflects a scene point is the same perspective image taken by a virtual camera located on the opposite side of the mirror. The location of the coordinate system of the virtual camera relative to the coordinate system of the real camera is found by applying a reflection transformation. If one represents the mirror with its normal n and the distance d measured from the real camera center, the reflection transformation D is found to be $$D = \begin{pmatrix} I - 2nn^T & 2dn \\ 0 & 1 \end{pmatrix}.$$

The transformation D between the real and virtual camera coordinate systems is a combination of a rigid transformation and a switch from a left to a right handed (or vice-versa) coordinate system. Also note that a reflection transform is its own inverse:

DD=I.

Figure 2B:
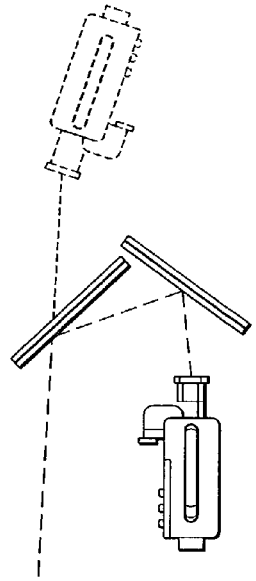

When two mirrors (see FIG. 2(b)) reflect a scene point, the virtual camera is found by applying two consecutive reflection transformations. The resulting transformation represents a planar rigid motion, meaning the direction of translation is orthogonal to the axis of rotation. It can also be shown that the axis of rotation is $(n_1 \times n_2)$, where $n_1$ and $n_2$ are the normals of the two mirrors. In the two mirror case there is no switch from a left to right handed system because the two mirror reflections negate each other.

For each additional mirror, the virtual camera is found by applying another reflection transformation. In general, if the number of mirrors is odd then the resulting transformation switches between a left and right handed coordinate system, thus producing a mirror image of the scene.

Figure 2C:
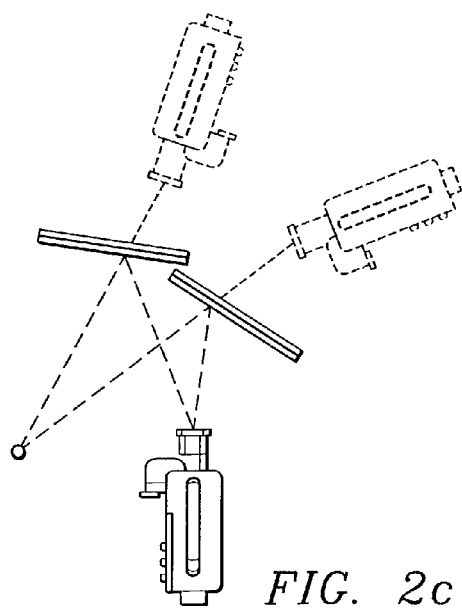

As shown in FIG. 2(c), if the field of view is split such that different mirrors reflect the scene onto different portions of the imaging plane, then the scene is imaged from multiple virtual cameras, and thus a stereo image is obtained. Now, it will be helpful to examine how mirrors can be used to obtain a rectified stereo image.

1 How Many Mirrors are Needed?

Figure 3:
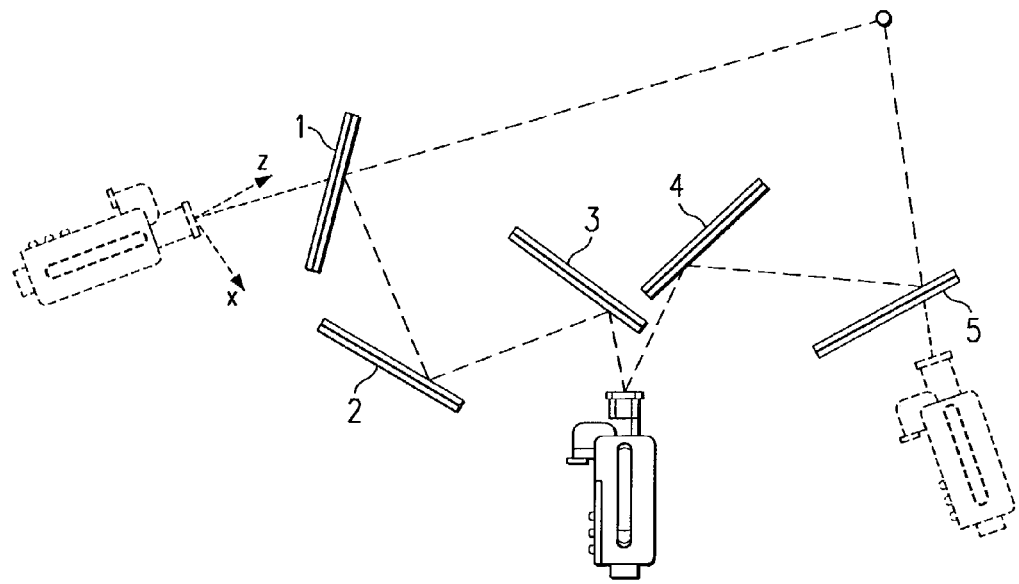
FIG. 3 depicts how the relative orientation between the left and right virtual cameras in a stereoscopic system can be found by applying consecutive reflection transformations in the order illustrated in the Figure.

To produce rectified images, a stereo system must meet several requirements. There must be no relative rotation between the two cameras, the translation must be parallel to the scan-lines of the image plane, and the internal parameters of the two cameras must be identical: For catadioptric stereo the last requirement is met because only a single camera is used. To ensure the first two requirements, the mirrors must satisfy the equation:

$$D_1 \ldots D_i \ldots D_m = \begin{pmatrix} 1 & 0 & 0 & b \\ 0 & 1 & 0 & 0 \\ 0 & 0 & 1 & 0 \\ 0 & 0 & 0 & 1 \end{pmatrix}, \quad (3)$$

where b is the baseline, m is the number of mirrors used and $D_i$ is the reflection transformation produced by the $i^{th}$ mirror. The mirrors are ordered as shown in FIG. 3 and each mirror is defined in a coordinate system attached to the left virtual camera, where the x-axis is along the scan-lines and the z-axis is in the direction of the optical axis.

Figure 4:
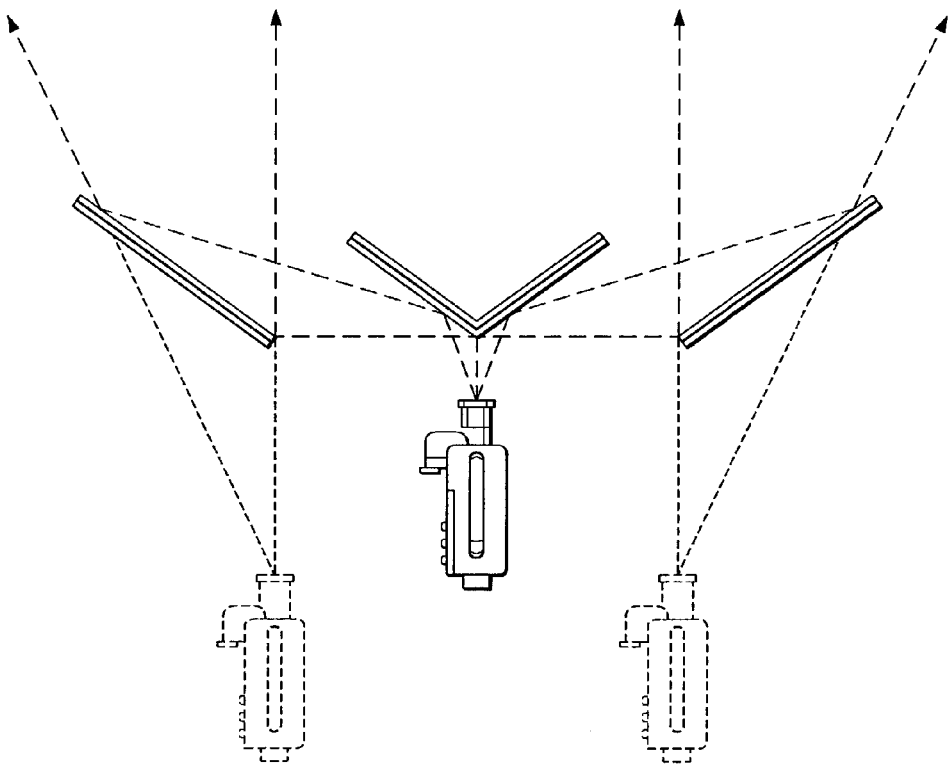
FIG. 4 illustrates how two sets of parallel mirrors may be used to construct a rectified stereo imaging system. However, this solution is not generally practical because the two virtual cameras do not share a common field of view.

Although satisfying equation (3) is sufficient to ensure rectification, there is one problem. Because we split the field of view of the real camera between the two virtual cameras we must guarantee that the fields of view properly overlap. FIG. 4 shows a four-mirror system where the two virtual cameras are rectified but do not share a common field of view. When the field of view is split between two different systems of mirrors, each virtual camera receives only half of the field of view of the real camera. Clearly, in practice the two half fields of view must overlap.

Figure 5:
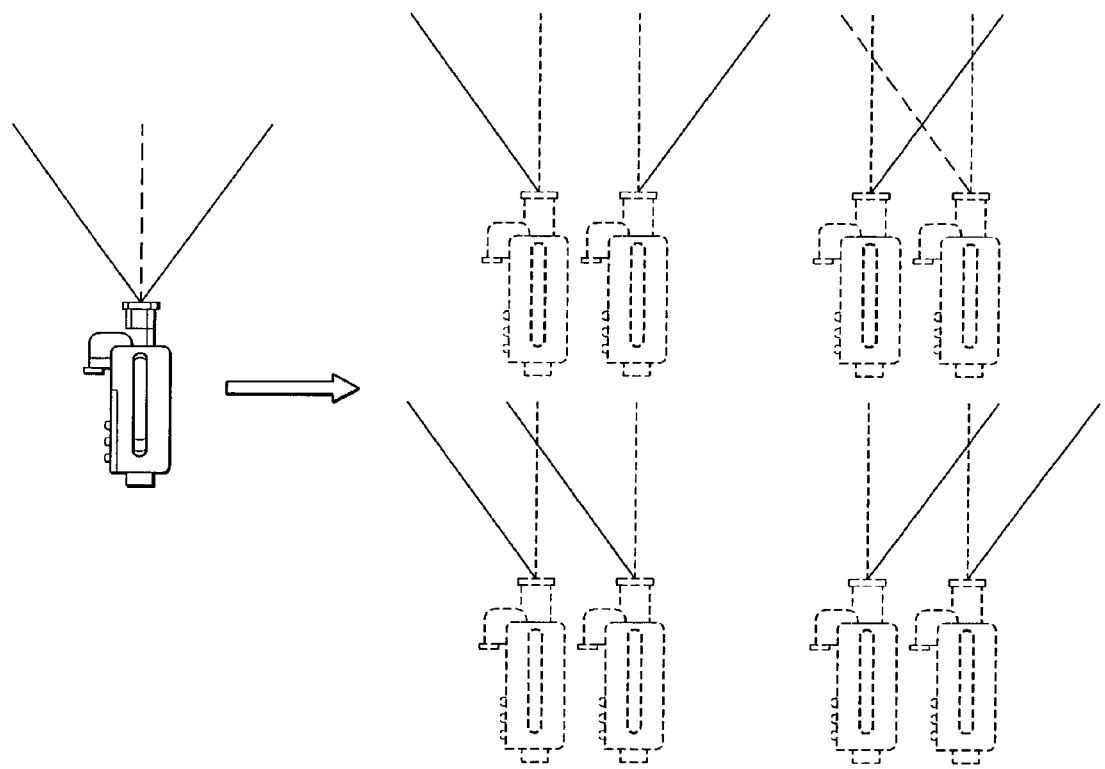
FIG. 5 illustrates the fact that once rectified, there are four possible configurations of the virtual cameras contributing to the composite stereo image. However, only the bottom two lead to a practical solution. The top left configuration has no overlapping field of view and the common field of view of the top right configuration is only a narrow beam. To obtain one of the bottom configurations an odd number of reflections must be used.

As shown in FIG. 5, each virtual camera receives either the left or right half field of view. When rectified, there are four possible configurations, depending upon the number of reflections. However, only the bottom two configurations lead to a practical stereo system. The top left configuration has no overlapping field of view and the top right only sees a narrow beam the width of the baseline. To obtain one of the configurations on the bottom, one half field of view must be reflected relative to the other and therefore an odd number of reflections are required. We enforce this by changing the direction of the x-axis.

$$D_1 \ldots D_i \ldots D_m = \begin{pmatrix} -1 & 0 & 0 & b \\ 0 & 1 & 0 & 0 \\ 0 & 0 & 1 & 0 \\ 0 & 0 & 0 & 1 \end{pmatrix}, \quad (4)$$

It is straightforward to show that for any number of odd reflections a solution exists. For m=1 the mirror normal $n_1 = [1,0,0]^T$ leads to a solution. For all odd m, (m>1) a trivial solution can be obtained by adding $$\frac{m-1}{2}$$

pairs of identical reflection transformations; because a reflection transformation is its own inverse each pair will cancel out.

Although there are many solutions to (equation 4) most are not physically realizable due to occlusions and intersecting mirrors. Next, we will discuss possible solutions using one and three mirrors, which may provide optimal solutions with respect to system size and simplicity, on the one hand, and image quality, on the other. Five or more mirrors can be used; however these systems can be considered more complex than is strictly necessary, given that their incremental advantages vis a vis the one- and three-mirror systems may be comparatively small. (Nonetheless, the teachings of the present disclosure will apply to such five-or-more mirror systems and those of ordinary skill in the art could readily apply such teachings to implement such systems).

2 Single Mirror Rectified Stereo

Figure 6:
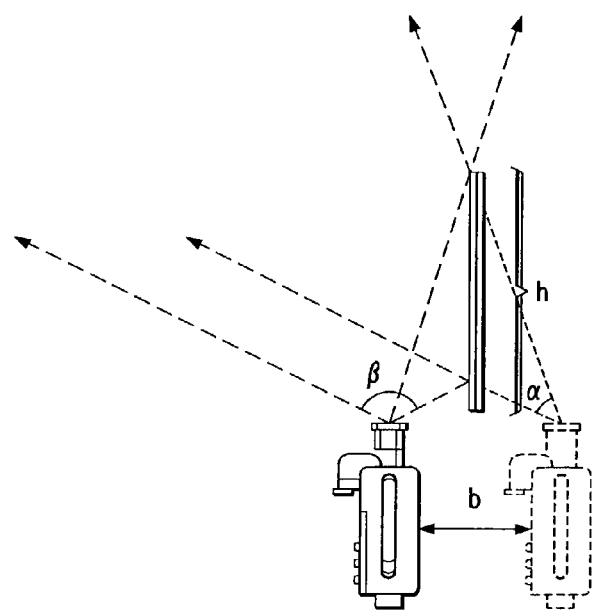
FIG. 6 illustrates the fact that to obtain a rectified image with a single mirror, the normal of the mirror must be parallel to the scan-lines of the camera. Note that the field of view of the right virtual camera will be limited by the finite size of the mirror.

To obtain a rectified image with a single mirror, the plane containing the mirror must satisfy the equation:

$$D_1 = \begin{pmatrix} I - 2n_1 n_1^T & 2d_1 n_1 \\ 0 & 1 \end{pmatrix} = \begin{pmatrix} -1 & 0 & 0 & b \\ 0 & 1 & 0 & 0 \\ 0 & 0 & 1 & 0 \\ 0 & 0 & 0 & 1 \end{pmatrix}, \quad (5)(3)$$

where $n_1$ and $d_1$ are the normal and distance of the mirror from the camera coordinate system. For this to be satisfied $n_1 = [1, 0, 0]^T$. Thus, the only solution using a single mirror occurs when the normal of the mirror is parallel to the scan-lines of the camera (the x-axis) as shown in FIG. 6. The stereo system will remain rectified for any distance $d^1$, however the baseline b will change as $b = 2d_1$.

The advantage of this solution is its simplicity. However, because a finite mirror must be used, the field of view of the virtual camera is limited by the angle the mirror subtends with respect to the virtual camera (see FIG. 6). The field of view α is related to the baseline b and the length of the mirror h as $$\alpha = \arctan\left(\frac{2h}{b}\right) - \frac{\pi}{2} + \frac{\beta}{2}. \quad (6)$$

Therefore, if a large baseline is desired then a large mirror must be employed or else the field of view will be severely limited.

Figure 7A:
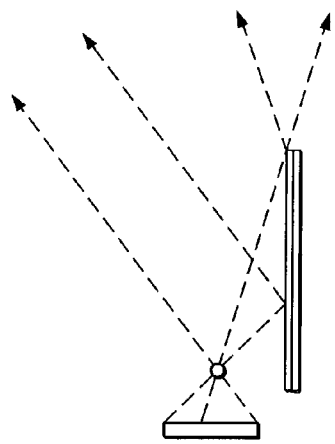
FIG. 7(a) illustrates that when a single mirror is used the left camera view uses a larger portion of the image detector than the right camera view.
Figure 7B:
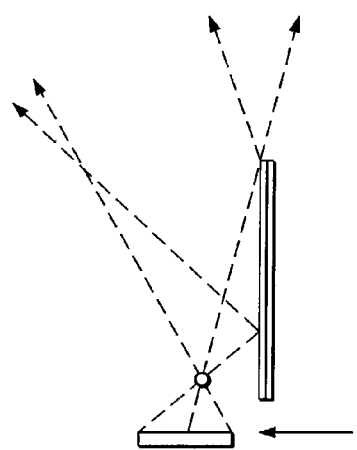
FIG. 7(b) shows that the asymmetry can be removed by shifting the image detector with respect to the imaging lens (center of projection).

Because the mirror is finite, a field of view asymmetry exists between the real and virtual camera. A larger portion of the image detector is used by the real camera. As shown in FIG. 7, this asymmetry can be removed by shifting the image detector with respect to the center of projection of the camera. For applications where the scene of interest lies close to the camera this has the benefit of increasing the viewing volume close to the stereo system.

3 Three Mirror Rectified Stereo

Figure 8:
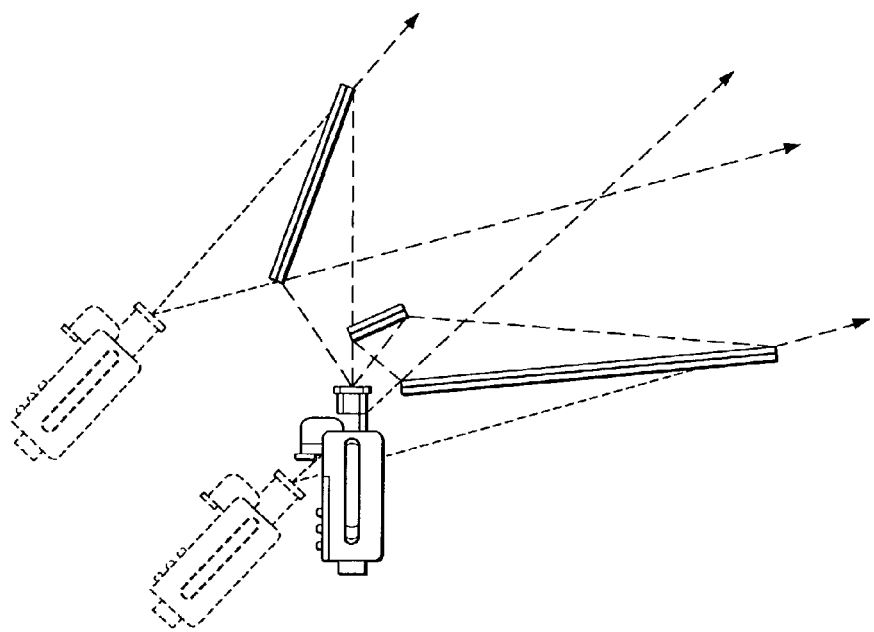
FIG. 8 illustrates methods for three-mirror rectified stereo. By using three mirrors, a rectified stereo system can be designed wherein the field of view of each virtual camera is half the field of view of the real camera.

It is possible t overcome the limitations of single mirror rectified stereo by incorporating additional mirrors. With three mirrors, it can be ensured that the field of view is substantially equally shared between the two virtual cameras (see FIG. 8). Furthermore, a large baseline can be obtained using relatively small mirrors. However, one cannot arbitrarily place the three mirrors. As will be shown, to obtain optimally-rectified stereo four specific geometric constraints between the mirrors and the camera must be substantially satisfied. From (equation 4) we know that the mirrors must be placed such that $$D_1 D_2 D_3 = \begin{pmatrix} -1 & 0 & 0 & b \\ 0 & 1 & 0 & 0 \\ 0 & 0 & 1 & 0 \\ 0 & 0 & 0 & 1 \end{pmatrix}. \quad (7)$$

Using equation (7) we will first derive three constraints by determining how the mirrors must be placed so that there is no rotation between the virtual cameras. Then we will show the remaining constraint that arises from requiring the direction of translation to be parallel to the scan-lines (the x-axis).

3.1 Rotation Constraints

The upper left 3×3 block of the matrix in equation (7) refers to the mutual rotation between the two virtual cameras. For rectification, we have:

$$R_1 R_2 R_3 = \begin{pmatrix} -1 & 0 & 0 \\ 0 & 1 & 0 \\ 0 & 0 & 1 \end{pmatrix}, \quad (8)$$

where $$R_i[I - 2n_i n_i^T] \quad (9)$$

Because each $R_i$ is both symmetric and its own inverse, equation (8) can be written as $$\begin{pmatrix} -1 & 0 & 0 \\ 0 & 1 & 0 \\ 0 & 0 & 1 \end{pmatrix} R_3 = R_1 R_2. \quad (10)$$

Recall that $R_1 R_2$ is a rotation matrix with a rotational axis orthogonal to both the mirror normals, which is $n_1 \times n_2$. This implies that $$\begin{pmatrix} -1 & 0 & 0 \\ 0 & 1 & 0 \\ 0 & 0 & 1 \end{pmatrix} R_3 (n_1 \times n_2) = (n_1 \times n_2) \quad (11)$$

It is straightforward to show that the equation $$\begin{pmatrix} -1 & 0 & 0 \\ 0 & 1 & 0 \\ 0 & 0 & 1 \end{pmatrix} R_3 (n_3 \times [1, 0, 0]^T) = (n_3 \times [1, 0, 0]^T) \quad (12)$$

must also hold. Therefore, to satisfy equation (8) it is necessary that both equation (11) and (12) are satisfied, meaning $$(n_1 \times n_2) = \lambda(n_3 \times [1,0,0]^T). \quad (13)$$

The scale factor $\lambda$ can be removed by taking the dot product with $n_1$ or $n_3$ giving us two independent constraints, $$n_1 \cdot (n_3 [1,0,0]^T) = 0 \quad (14)$$

and $$(n_3 \cdot (n_1 \times n_2) = 0 \quad (15)$$

This implies that the normals of the three mirrors $n_1$, $n_2$ and $n_3$ and the x-axis are all co-planar. When the normals are co-planar, the mirrors rotate the virtual cameras about a common axis. Of course, it will still be necessary to orient the mirrors so that the rotational angle is cancelled. But now it is possible to simplify the analysis by working in the two dimensions of the plane containing the normals and the x-axis. In 2-D the mirrors are represented by lines where $\theta_i$ is the angle the $i^{th}$ mirror normal makes with the x-axis of the real camera. For simplicity one has moved the x-axis to the real camera image plane.

Figure 9:
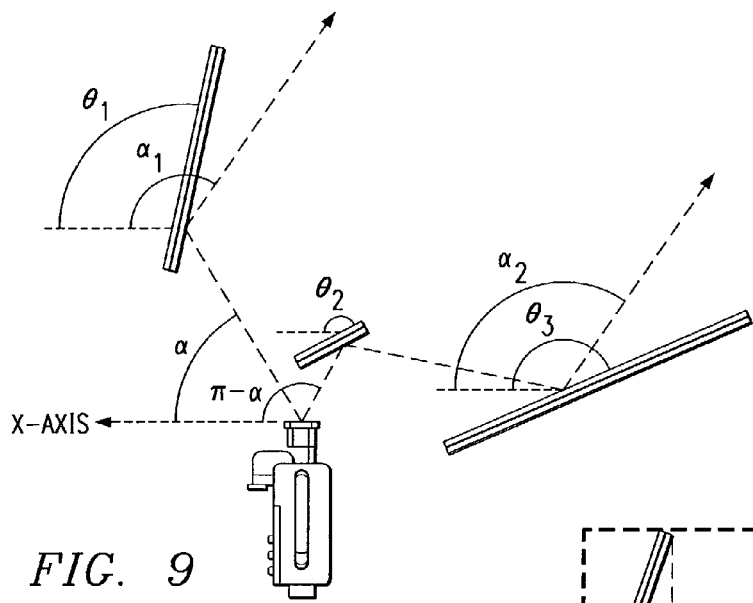
FIG. 9 illustrates mirror geometry in the three-mirror stereo imaging configuration of the present invention. The mirrors must be angled such that two rays at angles $\alpha$ and $\pi-\alpha$ are parallel after being reflected by the mirrors, that is $\alpha_1=\alpha_2$. Doing so will ensure that there is no rotation between the two virtual cameras.

If one considers a ray leaving the camera center at angle $\alpha$ and a corresponding ray leaving the camera at an angle $\pi - \alpha$, the mirrors must be angled such the two reflected rays are parallel, thus ensuring there is no rotation between the virtual cameras (see FIG. 9). After being reflected by the mirror oriented at angle $\theta_1$, the angle of the left ray is:

$$\alpha_1 = 2\theta_1 - \alpha \quad (17)$$

The angle of the right ray $\alpha_2$ after reflection by the two mirrors is $$\alpha_2 = 2\theta_3 - 2\theta_2 - \alpha \quad (18)$$

The two rays are parallel if $\alpha_1 = \alpha_2$. Therefore the rotation is cancelled if $$\theta_3 - \theta_2 = \theta_1 \quad (19)$$

One can express (Eq. 16) in terms of the normals of the mirrors as, $$n_3 \cdot n_2 = n_1 \cdot [1,0,0]^T \quad (\text{Eq. 17})$$

To summarize, if the normals of the mirrors satisfy the three constraints of equations (14), (15) and (19) then there will be no rotation between the two virtual cameras.

3.2 Translation Constraints

So far three constraints have been set forth that must be satisfied to rectify the virtual cameras. However, it is also necessary to ensure that the direction of translation between the virtual camera is along the x-axis. For this we will need to examine the translational part of equation (7), that is $$2d_3 R_1 R_2 n_3 + 2d_2 R_1 n_2 + 2d_1 n_1 = \begin{pmatrix} b \\ 0 \\ 0 \end{pmatrix}. \quad (20)$$

After multiplying throughout with $R_3 R_2 R_1$ and substituting equation (8) we get $$2d_3 R_3 n_3 + 2d_2 R_3 R_2 n_2 + 2d_1 = \begin{pmatrix} -1 & 0 & 0 \\ 0 & 1 & 0 \\ 0 & 0 & 1 \end{pmatrix} n_1 = \begin{pmatrix} -b \\ 0 \\ 0 \end{pmatrix}. \quad (21)$$

Next, by substituting equation (9) for the $R_i$ we have $$-2d_3 n_3 - 2d_2 n_2 + 4(n_3 \cdot n_2)d_2 n_3 + 2d_1 \begin{pmatrix} -1 & 0 & 0 \\ 0 & 1 & 0 \\ 0 & 0 & 1 \end{pmatrix} n_1 = \begin{pmatrix} -b \\ 0 \\ 0 \end{pmatrix}. \quad (22)$$

Although satisfying this equation ensures rectification, there is only one independent constraint in equation (22). Since the b is arbitrary, we expand only the last two equations which are $$-n_{3y}d_3+(n_3 \cdot n_2)n_{3y}-n_{2y})d_2+n_1d_1=0 \quad (23)$$

and $$-n_{3z}d_3+(2(n_3 \cdot n_2)n_{3z}-n_{2z})d_2+n_{1z}d_1=0 \quad (24)$$

where $n_1=[n_{ix}, n_{iy}, n_{iz}]^T$. Note that the vector equation (22) is composed of the normals of the mirrors and the x-axis. Since the rotation constraints ensure these vectors are coplanar we define the coordinate system such that these vectors lie in the x-z plane. When the normals are in the x-z plane then $n_{iy}=0$ for all i and equation equation (23) is satisfied, leaving only one constraint, equation (24).

There have now been derived the four constraints for three mirror rectified stereo. To summarize, if the normals of the three mirrors are co-planar with the x-axis, the angles between the mirrors satisfy equation (19) and the distances to the mirrors are chosen such that equation (24) is satisfied then the two virtual cameras will be rectified.

4 Compact Sensor Design

For many stereoscopic imaging applications, the compactness of the sensor is important. In this section we describe an automated tool for catadioptric stereo sensor design. Given design parameters such as baseline, field of view, and size of the real camera we compute the optimal placement of the mirrors such that the virtual cameras are rectified and sensor size is minimized.

To simplify the optimization, we assume the plane containing the normals of the mirrors is the x-z plane, meaning there is no tilt between the camera and the mirrors. Now, each of the three mirrors is represented by a line, so there are only six parameters: $\theta_1, \theta_2, \theta_3, d_2$ and $d_3$. Because we are restricted to the x-z plane, equations (14) and (15) are satisfied. Thus there are only two rectification constraints, one on the angles of the mirrors, equation (18), and one on the distances, equation (24). Given a desired baseline b we have one more constraint from equation (22)

$$2n_{3x}d_3+(2n_{2x}-4(n_3 \cdot n_2)n_{3x})d_2+2n_{1x}d_1=b \quad (25)$$

Figure 10:
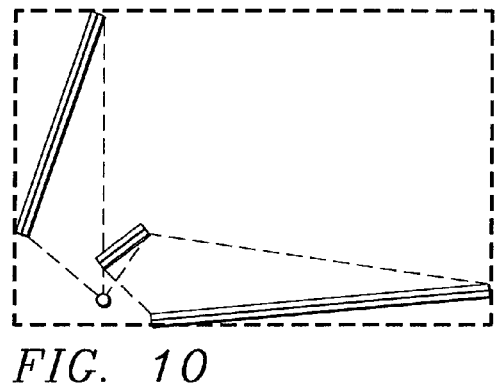
FIG. 10 illustrates the importance of siting mirror locations such that they satisfy the rectification constraints and minimize the perimeter of the bounding box, for a given baseline and field of view. The bounding box is found by intersecting the field of view of the camera with the mirror locations and determining the extreme points among the mirror end points and camera center of projection.

Three constraints on six parameters leaves three free parameters. To optimize these parameters some criteria for sensor size must be chosen. One simple measure is the perimeter of the bounding box of the mirrors and the center of projection of the camera (see FIG. 10).

To find the best configuration we search through all possible locations $(\theta_1, d_1)$ of the first mirror and possible angles $\theta_2$ for the second mirror. The remaining three parameters, the distance $d_2$ to the second mirror, the distance $d_3$ to the third mirror and the angle $\theta_3$ of the third mirror are found by solving equations (18), (24) and (25), where $n_{ix}=\cos\theta_i$ and $n_{iz}=\sin\theta_i$. For each set of computed parameters we determine the end points of the mirrors by tracing the optical axis and the limiting rays of the field of view and intersecting them with the mirrors. Once the end points are found the perimeter of the bounding box is computed. The design that minimizes the perimeter is chosen.

Figure 11:
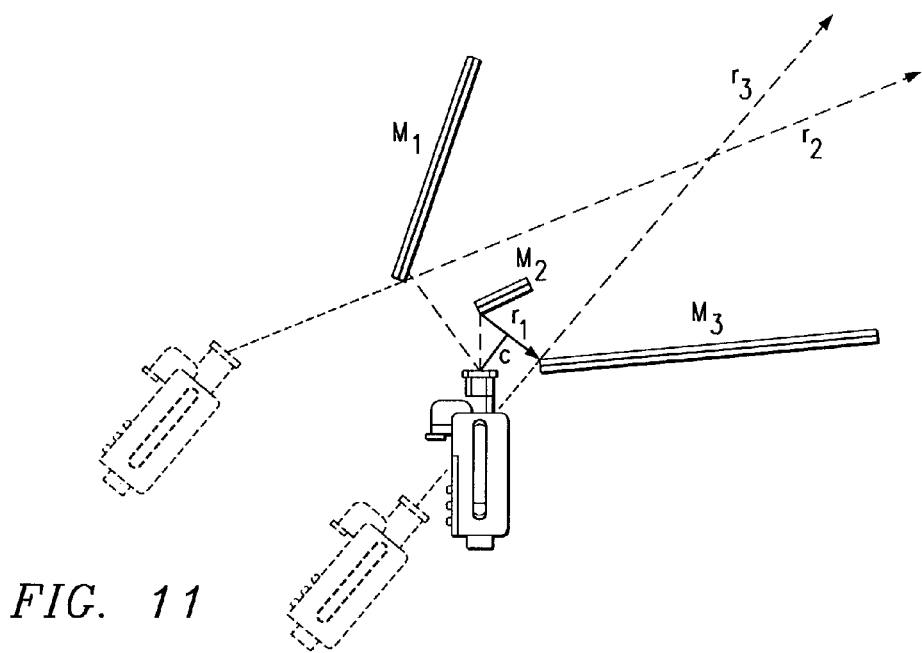
FIG. 11 illustrates the importance of assuring that the reflected scene rays are not occluded by the mirrors. Therefore, it is highly preferable that the ray $r_2$ does not intersect the mirrors $M_2$ and the ray $r_3$ does not intersect $M_2$. Given some notion of the size of camera, it can be ensured that the ray $r_1$ is at a minimum distance c from the camera center of projection.

We only admit solutions where the mirrors do not occlude each other. Thus we ensure that the ray $r_2$, in FIG. 11, does not intersect the mirrors $M_2$ and $M_3$ and the ray $r_3$ does not intersect $M_2$. In addition, we only consider solutions where the real camera does not see itself and thus we ensure the ray $r_1$ is a minimum distance c from the camera center of projection (note that c is proportional to the baseline b and determined from the size of the camera).

Figure 12A:
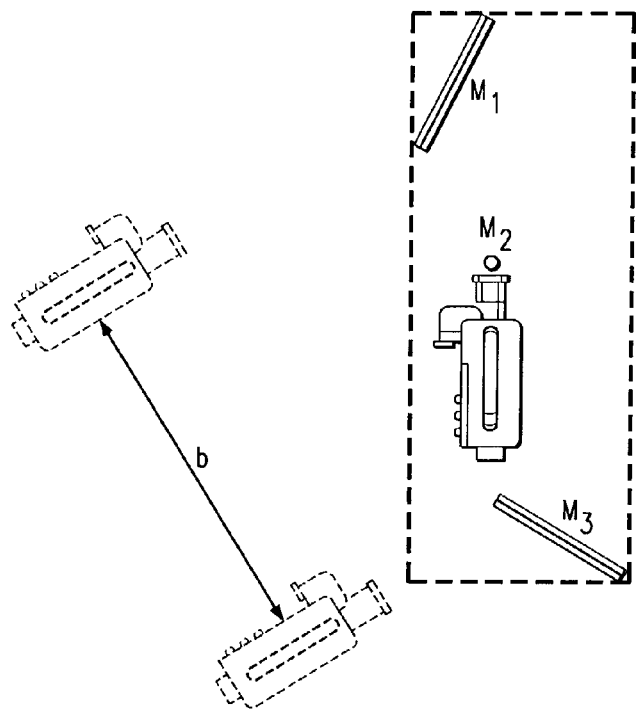
FIG. 12(a) shows that (disregarding the size of the camera) for c=0, then the optimal solution has one mirror at the center of projection.
Figure 12B:
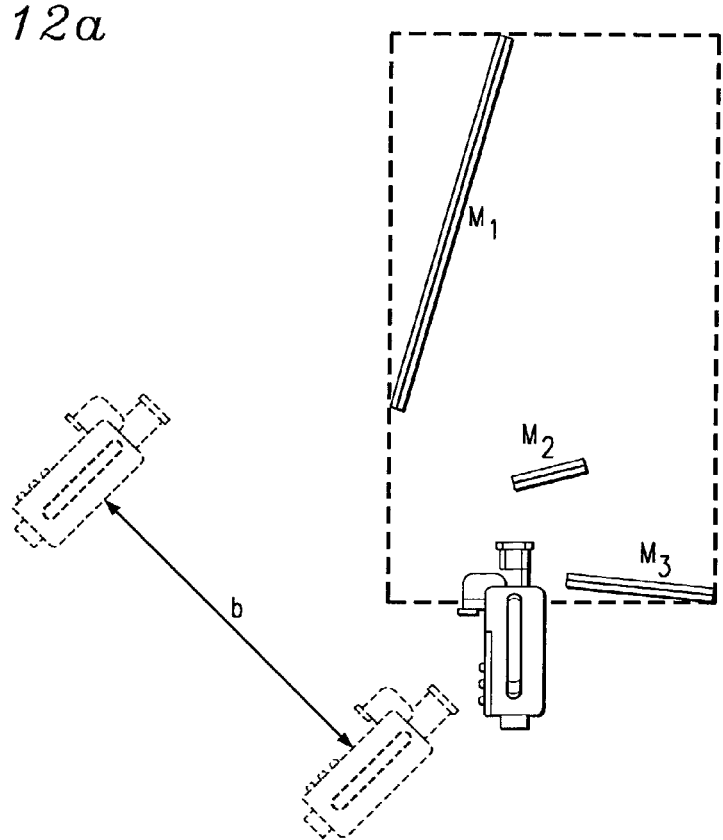
FIG. 12(b) illustrates a configuration that is optimal when c=0.1. For scale, the baseline between the virtual cameras is shown.

FIG. 12 shows two optimal configurations for a camera with a 60° field of view. As shown in FIG. 12(a), when c=0 the second mirror is infinitesimally small and located at the center of projection of the camera. FIG. 12(b) shows the optimal solution when c=0.1.

Figure 13:
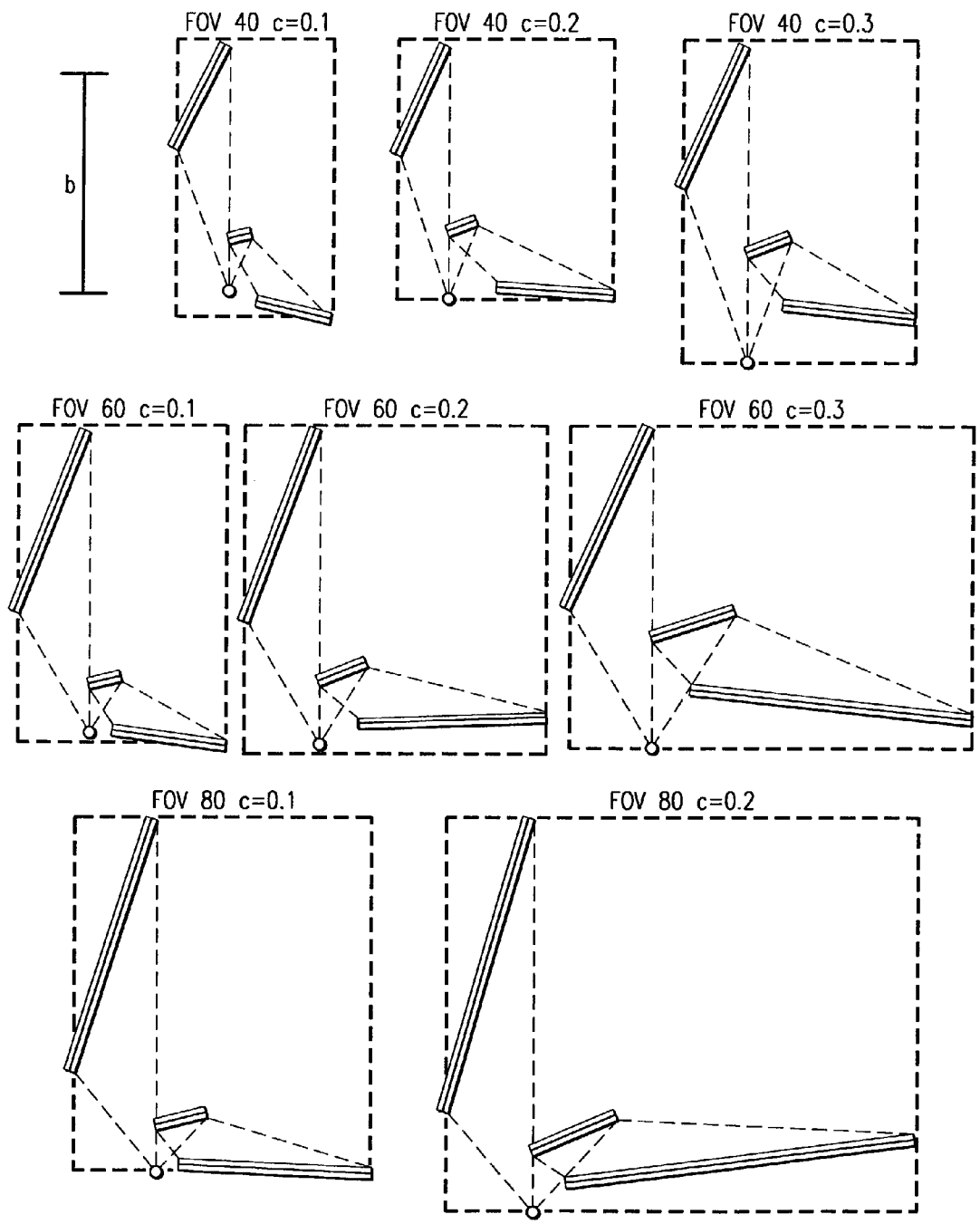
FIG. 13 shows that the size of the optimized sensor depends on the field of view (FOV) and the value for c. In the upper left corner, the baseline b, which is the same for all the sensors, is shown for scale.

As both c and the field of view increase the optimal sensor size also increases. FIG. 13 shows a sampling of optimized sensors for a variety of different fields of view and values for c. Note that we may use the same approach to find the optimal sensor for some other size criterion, such as the area of the bounding box.

5 Error Tolerance

Once a mirror configuration is chosen the location and orientation of the camera is determined up to a translation orthogonal to the mirror normals. Although the mirrors can be placed with high accuracy, inevitably errors will be introduced when positioning the camera and lens with respect to the mirrors. In this section we examine the effect of these placement errors on the rectified geometry.

For simplicity we assume the desired configuration is one where the optical axis of the camera is in the plane defined by the mirror normals and the center of projection of the camera, referred to as the mirror normal plane. We will look at three sources of errors: misplacement of the center of projection of the imaging system, misalignment of the orientation of the optical axis within the mirror normal plane and tilt of the optical axis with respect to the mirror normal plane.

5.1 Misplacement of the Center of Projection

Misplacement of the camera center of projection does not alter the normals of the mirrors; therefore, we only need to consider the effect on the location and not the orientation of the virtual cameras. Moving the center of projection of the camera from the desired location c to the point ĉ causes the virtual cameras v and v' to shift to new locations v̂ and v̂' see FIG. 14). If $D_1$, $D_2$ and $D_3$ are reflection transformations about the three mirrors then $\hat{v}=D_1\hat{c}$ and $\hat{v}'=D_3D_2\hat{c}$. Since a reflection transformation is its own inverse we also have $\hat{v}'=D_3D_2(D_1D_1)\hat{c}$ which leads to $\hat{v}'=D_3D_2D_1\hat{v}$. From the rectification constraint of equation (7) it is easy to show that $\hat{v}'$ is related to $\hat{v}$ by just a shift along the x-axis. Thus, the rectification of the virtual cameras is invariant to the position of the center of projection of the real camera, the only effect being a change in the baseline. This is an important property because it is difficult to accurately locate the center of projection of an imaging system.

5.2 Misalignment of the Optical Axis

Figure 14:
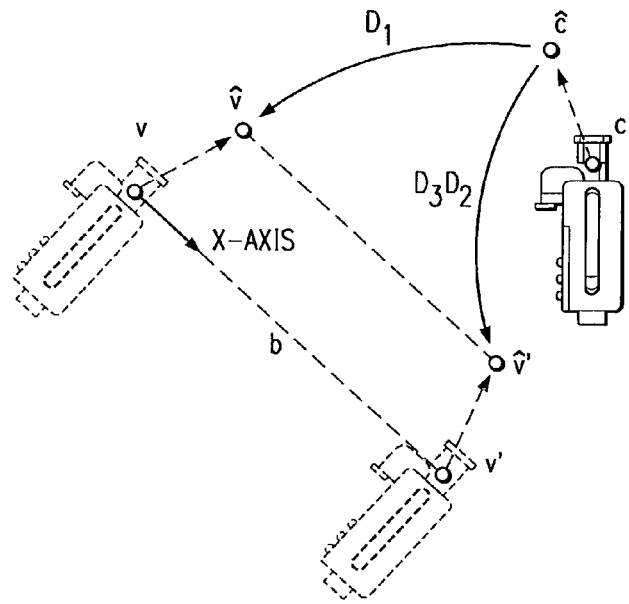
FIG. 14 illustrates the effects of moving the center of projection of the camera from c to ĉ, which causes the virtual cameras v and v' to shift to the point v̂ and v̂'. The location of v̂ is found by reflecting ĉ about the first mirror using the transformation $D_1$, and v̂' is found by reflecting ĉ about the second and third mirrors using $D_3 D_2$. Although the baseline is no longer b, the new virtual cameras remain rectified because the direction of translation is still along the x-axis.
Figure 15:
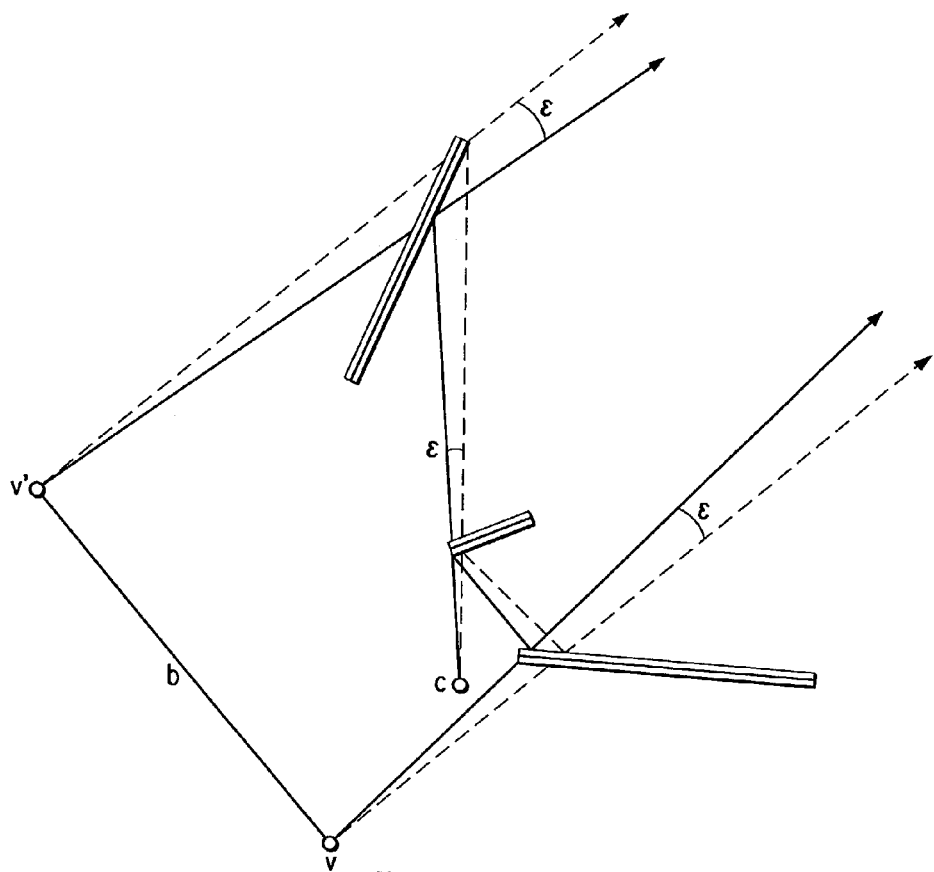
In FIG. 15, the dotted lines shows the desired orientation of c the camera and the rectified virtual cameras v and v'. The solid lines show the orientation of the virtual cameras if the real camera has an angular error of ϵ. In this case, the virtual cameras verge and the cameras will no longer be rectified. The amount of vergence and thus the rectification error is independent of the configuration of the mirrors.

Next we consider misalignment of the orientation of the camera within the mirror normal plane. Misaligning the optical axis of the camera does not alter the locations of the virtual cameras but only their orientation. As shown in FIG. 14, an angular error of ϵ causes the virtual cameras to verge resulting in a rotation between the virtual cameras. Note that the amount of vergence is independent of the particular configuration of the mirrors. For a verged system the rectification error in pixel units depends on the amount of vergence, the field of view of the camera and the location in the image. The rectification error is sub pixel everywhere in the image if ϵ

$$\varepsilon < \cot^{-1}\left(\frac{P}{2}\tan\frac{\alpha}{2}\right),$$

where P is the height of the image in pixels and α is the field of view of the camera. When the field of view is less than 90° a vergence angle of about 0.2° can be tolerated at a typical imaging resolution of approx. 500 pixels.

5.3 Tilt of the Optical Axis

Another source of error is the tilt of the camera with respect to the mirror normal plane. Tilting the camera causes the mirror normals to rotate about the x-axis. Given the rotation $R_x$ the new mirror normals are $\hat{n}_1 = R_x n_1, \hat{n}_2 = \hat{n}_1 = R_x n_2$ and $\hat{n}_3 = R_x n_3$. It is straightforward to show that if the angle constraint $n_3 \cdot n_2 = n_1 \cdot [1,0,0]^T$, given in equation (19), holds for the old normals then $\hat{n}_3 \cdot \hat{n}_2 = \hat{n}_1 \cdot [1,0,0]^T$ also holds for the new normals. Thus, the virtual cameras remain parallel when the camera is tiled.

Figure 16A:
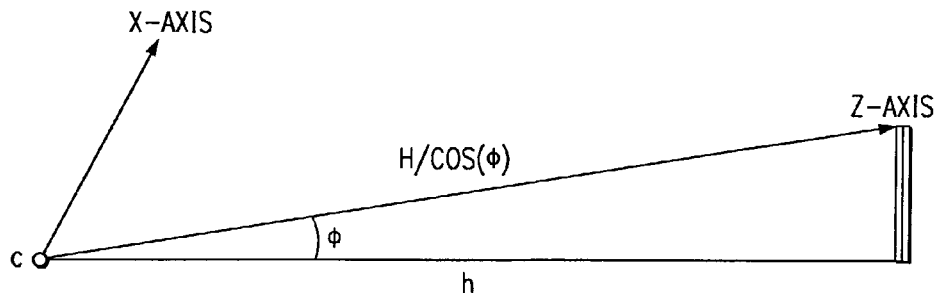
FIG. 16(a) shows a side view of the camera located at c with the optical axis tilted and pointing along the z-axis. Tilting the z-axis by angle ϕ causes the distance to the mirror along the optical axis to increase from h to h/cos ϕ.
Figure 16B:
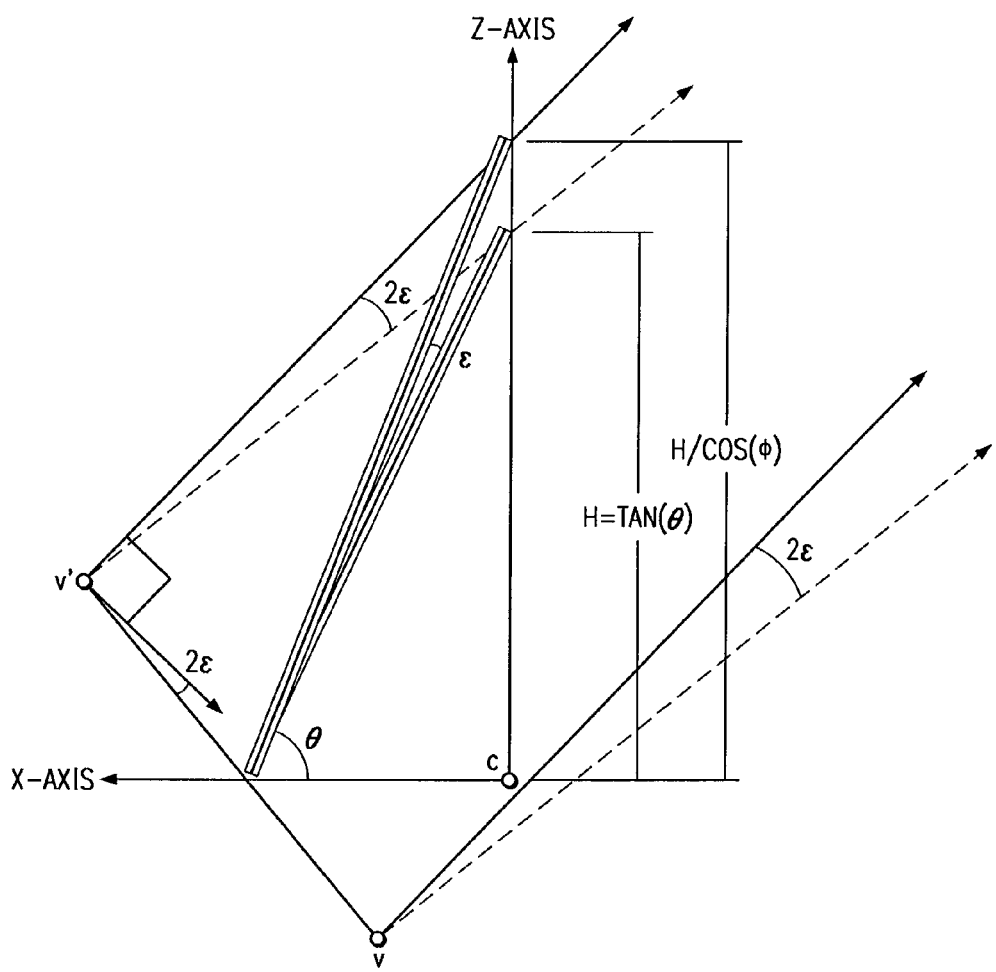
FIG. 16(b) shows a top view. When the camera is tilted, the angle of the mirror changes with respect to the coordinate system of the camera. Although the virtual cameras remain parallel they both rotate by an angle 2ϵ where ϵ is the amount of the change in the angle of the mirror.

Although the virtual cameras remain parallel they both rotate causing the direction of translation to turn away from the scan-lines. The change in the direction of translation is dependent on φ the amount of tilt, but unlike the previous case this error is dependent on the angles of the mirrors. FIG. 16 shows the effect on a single mirror of tilting the camera. Tilting the camera causes the intersection of the mirror with the optical axis to change and thus the angle of the mirror with respect to the coordinate system of the camera. If the camera is tilted φ and the angle of the mirror is given by θ then ε the change in the angle of the mirror is $$\varepsilon = \tan^{-1}\left(\frac{\tan\theta}{\cos\phi}\right), -\theta \quad (26)$$

For a given tilt, ε is minimized as the mirror angle approaches either 0° or 90° and is maximum where θ=45°. The rectification error depends on the error in the direction of translation, which is 2ε. Even when θ=45°, this error grows slowly as $$\frac{\partial \varepsilon}{\partial \phi} = 0 \text{ at } \phi = 0.$$

For example, a tilt error of φ=1° results in a direction of translation error of less than 0.009°. Therefore, the rectification error is much less sensitive to tilt errors than to misalignment errors. In this analysis we have assumed the desired configuration is one where the optical axis is in the mirror normal plane. If the desired configuration is one where the camera points up or down at oblique angles with respect to the mirrors, the rectification will be more sensitive to small tilt errors. In summary, misplacement of the camera center does not effect the rectified geometry, misaligning the optical axis introduces vergence between the virtual cameras, and tilting the optical axis rotates the cameras causing a change in the direction of translation.

6 Experimental Results

Figure 17A:
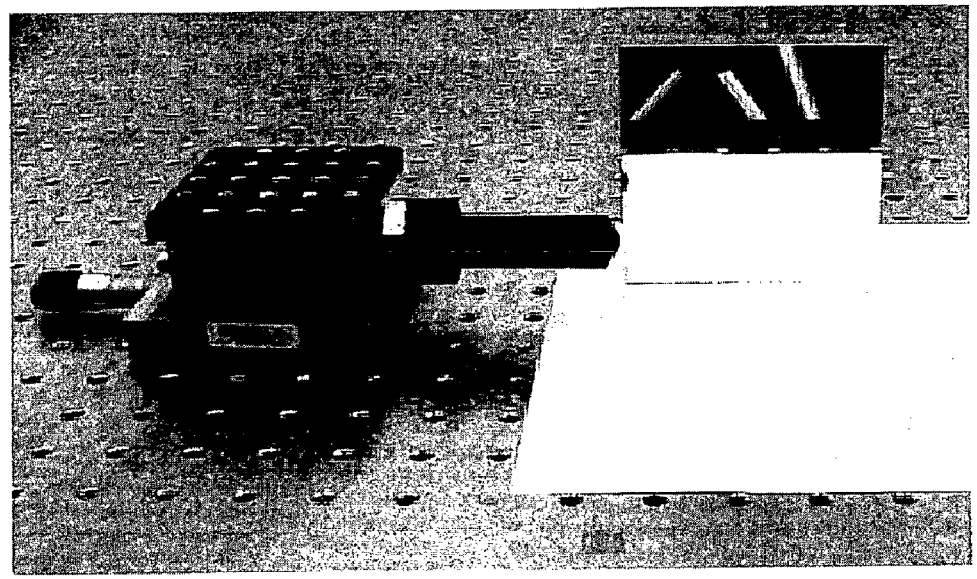
In FIG. 17(a), a single mirror is placed such that the mirror normal is perpendicular to the optical axis of the imaging system.

The constraints introduced in the preceding sections have been used to build both one and three mirror stereo sensors. As in FIG. 17(a), it is possible to capture rectified stereo images using a single mirror by placing the mirror parallel to the optics of the camera. It was found that aligning the mirror by hand was adequate to obtain a depth map of the scene (see FIG. 18). To demonstrate that the stereo image is rectified the correspondence search is only performed along the scan-lines. The depth map was computed on a 640×480 image using both SSD and normalized cross-correlation with a 15×15 size window. In the single mirror case we found that normalized cross-correlation is beneficial because of intensity differences introduced by the reflection of scene rays at acute angles with the mirror (recall that the reflectance of a mirror falls slightly as a function of the angle of incidence).

Figure 17B:
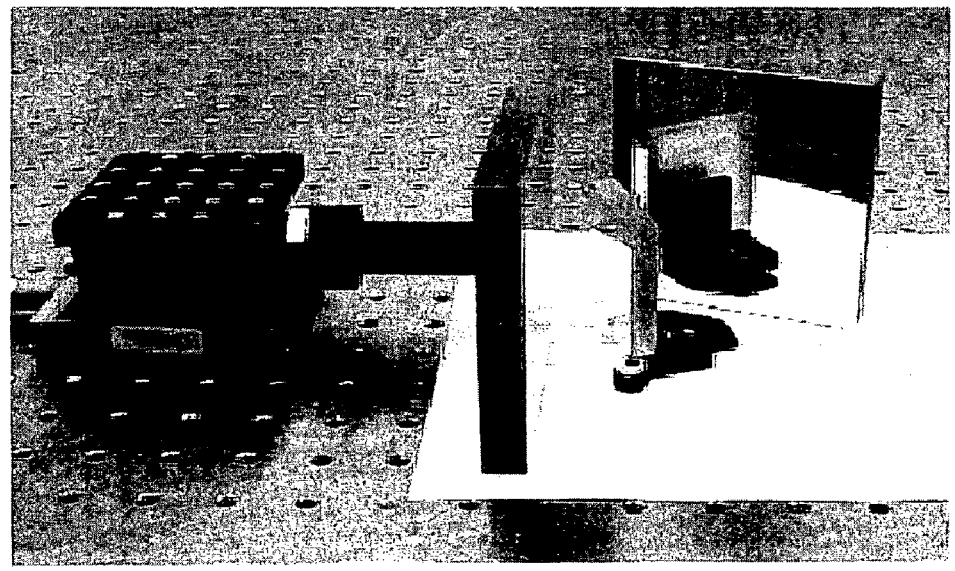
In FIG. 17(b), three mirrors are placed in a rectified configuration.

To construct a three mirror system, it was first necessary to find the optimal configuration as described in the previous section, using a 70° field of view and a value of c=0.2. The system was scaled so that the baseline b=10 cm and c=2 cm. Using a drawing tool, the location of the three mirrors and camera center of projection were printed on a piece of paper in order to accurately place the mirrors. FIG. 17(b) shows the experimental annorations.

Figure 19A:
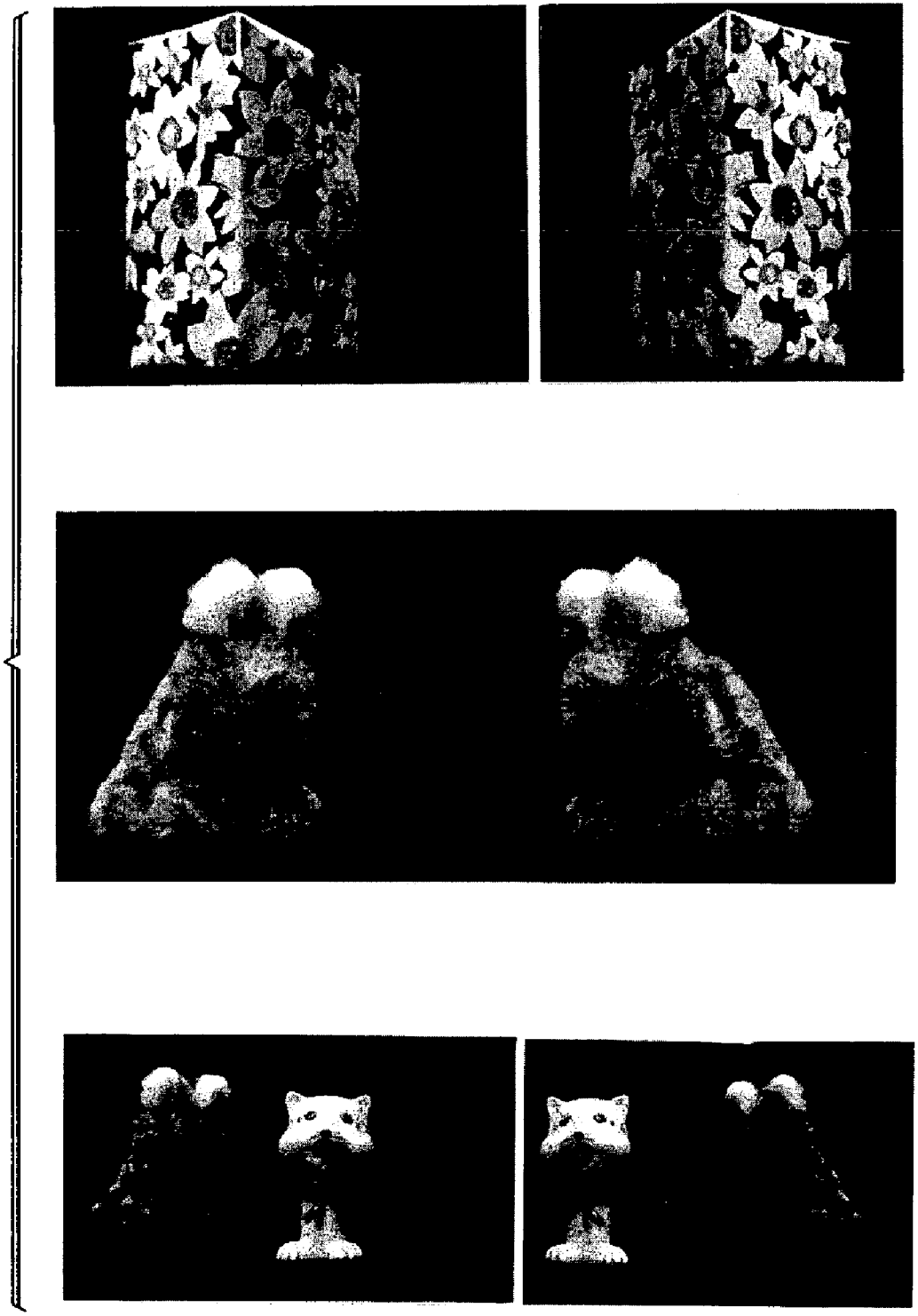
In FIG. 19(a) three 640×480 images (cropped for display) were captured using three mirrors. Before stereo matching along the scan-lines is performed, the right half of each image is flipped to remove the reflection.
Figure 19B:
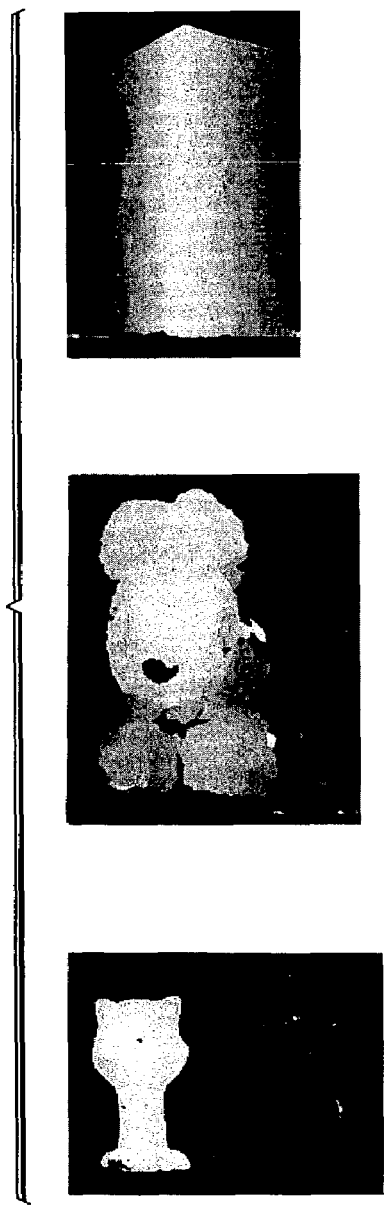
FIGS. 19(b) and 19(c) are the depth maps obtained using SSD and normalized cross-correlation with a 15×5 window. It will be noted that the difference between the two depth maps is negligible, thus emphasizing the fact that when only a single camera is used SSD is sufficient for stereo matching. Depth is not computed for the background pixels.
Figure 19C:
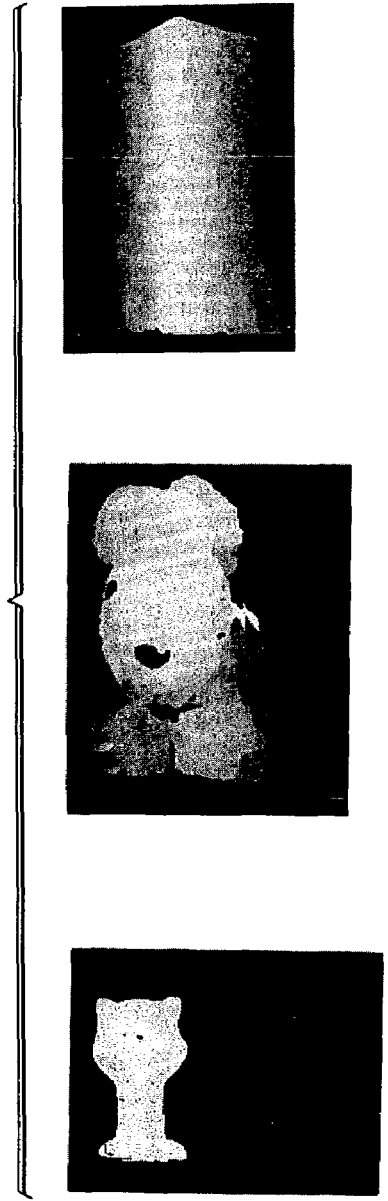

FIG. 19(a) shows several images taken by the three mirror system. FIGS. 19(b) and 19(c) show depth maps computed by searching along the scan-lines using both SSD and normalized cross-correlation. For the three mirror case, we found that normalizing the data did not improve the results. The three mirror systems does not suffer from the acute angles of incidence which are encountered when using a single mirror. Therefore, the extra computational cost of normalized cross-correlation can be avoided.

The stereo images of the present invention may be obtained and processed in conjunction with desired industry-standard equipment for photographic imaging and for processing, storage, manipulation, and transmission of digitized photographic images. Thus, a variety of planar imaging devices (e.g., still cameras and photographic film, digital cameras) and of computerized photographic processing systems (e.g., storage and processing and transmission software and hardware of desired platform) can be used in conjunction with the methods and systems disclosed herein. Those of ordinary skill in the art will recognize that as long as the geometric constraints between and among the image detector, mirrors, and imaged object as set forth herein are substantially satisfied, the advantages of the present invention can be obtained with essentially any arbitrary appropriate combination of image detector, mirror, image processor, etc.

7 Conclusion

Thus, the present invention provides the design for a class of novel stereo sensors. By avoiding the need for synchronization, rectification, and normalization of the data, these sensors are well-suited for real-time applications. Specific sets of geometric constraints have been provided that must be satisfied in order to obtain rectified stereo images from a catadioptric system. In addition, the present invention discloses how to use the remaining degrees of freedom to design compact stereo sensors. Through error analysis, the practical feasibility of building these sensors has been shown. Specifically, those of ordinary skill within the art will recognize that the present invention provides a set of geometrical sensor system constraints that are specific but also reasonably flexible. That is, while it is important that the respective planes, normals, etc. substantially meet the recited set or sets of constraints and equations, specifically as to the respective coplanarity or orthogonal relationships, it is an advantage of the present invention that deviations from exact coplanarity or orthogadity, for example, of a few degrees (say, less than five degrees (5°)) will not prevent substantial provision of inherently-rectified stereo images.

While the present invention has been described in terms of the foregoing specific embodiments thereof for illustrative purposes, these embodiments do not delimit or exhaust the scope of the present invention. Rather, it will be apparent to those skilled in the art that various alterations and modifications may be made to the described embodiments without departing from the spirit and scope of the invention, which are defined only by the appended claims.

We claim as our invention and desire to secure coverage for:

1. A device for capturing stereoscopic images of a scene, wherein each stereoscopic image is a composite of two nonstereoscopic images representing different viewpoints of the scene, said device comprising:
    an image detector having an imaging plane and a central axis normal to said imaging plane; and
    a substantially planar mirror with a reflecting plane disposed parallel to, but separated by a finite base distance from, said central axis of said image detector so that two rectified nonstereoscopic images representing different viewpoints of the scene are projected simultaneously on to said imaging plane of said image detector to form a composite stereoscopic image of the scene, non-computer based rectification of said nonstereoscopic images accomplished only with placement of said substantially-planar mirror.

2. The device of claim 1, wherein said image detector comprises a camera having an image plane, and wherein said two self-rectified nonstereoscopic images are rectified with respect to a scanning line in said camera image plane.

3. A device for capturing a stereoscopic image of a scene, wherein the stereoscopic image is a composite of two nonstereoscopic images representing different viewpoints of the scene, the device comprising:
    a planar image detector lying in a first plane, said first plane having a horizontal axis and a vertical axis; and
    an odd number of substantially planar mirror(s),
    wherein axes normal to each of said odd number of substantially planar mirrors are substantially coplanar,
    wherein the odd number of substantially planar mirrors are configured to reflect two rectified nonstereoscopic images representing different viewpoints of the scene simultaneously on to said first plane to form the composite stereoscopic image of the scene, non-computer based rectification of said nonstereoscopic images accomplished only with placement of said substantially-planar mirrors,
    wherein the two rectified nonstereoscopic images have no relative rotation between them and have relative translation only parallel to scan-lines in the image plane, and
    wherein the fields of view of the two rectified nonstereoscopic images overlap.

4. The device of claim 3, wherein axes normal to each of said odd number of substantially planar mirrors all lie in a plane substantially parallel to said first plane's horizontal axis.

5. The device of claim 4, wherein a first one of said odd number of substantially planar mirrors lies at an angle θ1 with respect to the horizontal axis of said first plane, a second one of said odd number of substantially planar mirrors lies at an angle θ2 with respect to the horizontal axis of said first plane, and a third one of said odd number of substantially planar mirrors lies at an angle θ3 with respect to the horizontal axis of said first plane, and wherein the angles θ1, θ2, and θ3 substantially satisfy the relation θ3−θ2=θ1.

6. The device of claim 5, wherein said first, second, and third ones of said odd number of substantially planar mirrors have normals n1, n2, and n3, respectively, wherein said normals and distances $d_1$, $d_2$, and $d_3$ from the center of said image detector to each of said first, second, and third mirrors, respectively, along its respective normal, substantially satisfy the equation: $-n_{3z}d_3 (2(n_3 \cdot n_2)n_{3z}-n_{2z})d_2 + n_{1z}d_1 = 0$, where $n_i = [n_{ix}, n_{iy}, n_{iz}]^T$.

7. A method for producing a stereoscopic image of a scene as a composite of two nonstereoscopic images representing different viewpoints of the scene, said method comprising:
    acquiring a first nonstereoscopic image of the scene;
    simultaneously, acquiring a second nonstereoscopic image of the scene,
    wherein said first and second nonstereoscopic images of the scene are rectified with respect to each other and acquired simultaneously using an odd number of substantially planar mirror(s); and
    combining said first and second nonstereoscopic images atwith a single image detector without additional rectifying steps to form the composite stereoscopic image, non-computer based rectification of said nonstereoscopic images accomplished only with placement of said substantially-planar mirror(s).

8. The method of claim 7, comprising:
    detecting said first nonstereoscopic image of the scene using at least a first mirror; and
    detecting said second nonstereoscopic image of the scene using in combination at least a second and a third mirror; and
    combining said first and second nonstereoscopic images at a single image detector without any additional rectifying steps, whereby a rectified stereoscopic image is formed.

9. The method of claim 8, wherein the single image detector is a planar image detector having an image plane, and wherein the image plane of said image detector has a horizontal axis and a vertical axis, and wherein axes normal to each of said first and said at least second and third mirrors are substantially coplanar.

10. The method of claim 9, wherein said first and said at least second and third mirrors each has a respective normal axis that lies in a plane substantially parallel to said image plane's horizontal axis.

11. The method of claim 10, wherein said first mirror lies at an angle θ1 with respect to the horizontal axis of said image plane, said second mirror lies at an angle θ2 with respect to the horizontal axis of said image plane, and said third mirror lies at an angle θ3 with respect to the horizontal axis of said image plane, and wherein the angles θ1, θ2, and θ3 substantially satisfy the relation θ3−θ2=θ1.

12. The method of claim 11, wherein said first, second, and third mirrors have normals n1, n2, and n3, respectively, and wherein said normals and distances $d_1$, $d_2$, and $d_3$ from the center of said image detector to each of said respective mirrors along their respective normals, substantially satisfy the equation:

$$-n_{3z}d_3 + (2(n_3 \cdot n_2)n_{3z})d_2 + n_{1z}d_1 = 0, \text{ where } n_i = [n_{ix}, n_{iy}, n_{iz}]^T.$$

13. A method for computerized processing of digitized stereoscopic images, wherein each stereoscopic image is a composite of two or more nonstereoscopic images representing different viewpoints of a scene, the method comprising:
    providing to a computer processor in digitized form a composite stereoscopic image obtained from a single image detector, which has acquired at least two rectified nonstereoscopic images simultaneously using an odd number of substantially planar mirror(s) and combined the at least two rectified nonstereoscopic images to form the composite stereoscopic image, non-computer based rectification of said nonstereoscopic images accomplished only with placement of said substantially-planar mirror; and performing further processing on the composite stereoscopic image without any further rectification of the at least two rectified nonstereoscopic images to form the composite stereoscopic image.

14. The method of claim 13, wherein the step of performing further processing consists of one of the group of storing, manipulating, transmitting, and outputting the image.

15. The method of claim 13, wherein at least three mirrors are used to provide the stereoscopic image.

16. The method of claim 13, wherein the step of performing further processing consists of one of the group of storing, manipulating, transmitting, and outputting the image.

* * * * *